(12) United States Patent
Abe et al.

(10) Patent No.: US 10,090,690 B2
(45) Date of Patent: Oct. 2, 2018

(54) SECONDARY BATTERY PROTECTION CIRCUIT

(71) Applicants: MITSUMI ELECTRIC CO., LTD., Tokyo (JP); ITM Semiconductor Co., Ltd., Chungcheongbuk-do (KR)

(72) Inventors: Shuhei Abe, Tokyo (JP); Hyuk Hwi Na, Chungcheongbuk-do (KR); Ho Seok Hwang, Gyeonggi-do (KR); Young Seok Kim, Chungcheongbuk-do (KR); Sang Hoon Ahn, Chungcheongbuk-do (KR)

(73) Assignees: MITSUMI ELECTRIC CO., LTD., Tokyo (JP); ITM Semiconductor Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 15/640,713

(22) Filed: Jul. 3, 2017

(65) Prior Publication Data
US 2018/0013299 A1  Jan. 11, 2018

(30) Foreign Application Priority Data

Jul. 11, 2016 (JP) ................................ 2016-137100

(51) Int. Cl.
*H02J 7/00* (2006.01)
(52) U.S. Cl.
CPC .......... *H02J 7/0029* (2013.01); *H02J 7/0063* (2013.01); *H02J 2007/004* (2013.01); *H02J 2007/0037* (2013.01); *H02J 2007/0039* (2013.01); *H02J 2007/0067* (2013.01)

(58) Field of Classification Search
CPC .. H02J 7/0031; H02J 2007/004; H02J 7/0029; H02J 2007/0039; H02J 7/0026; H02J 7/0024; H01M 2200/00
USPC ................................................ 320/134, 136
See application file for complete search history.

(56) References Cited

U.S. PATENT DOCUMENTS

| 2009/0121683 | A1* | 5/2009 | Goto ..................... | H01M 10/48 320/134 |
| 2017/0098943 | A1* | 4/2017 | Kubota ................. | H02J 7/0029 |

FOREIGN PATENT DOCUMENTS

| JP | 2007-068390 | | 3/2007 |
| JP | 2007068390 A | * | 3/2007 |

* cited by examiner

*Primary Examiner* — Nghia Doan
(74) *Attorney, Agent, or Firm* — IPUSA, PLLC

(57) ABSTRACT

A secondary battery protection circuit includes a first terminal connected to a power supply path between a secondary battery and a MOS transistor, a second terminal connected to the power supply path between a load and the MOS transistor, a third terminal connected to a gate of the MOS transistor, a fourth terminal connected to a back gate of the MOS transistor, a control circuit that outputs a switch control signal based on a detected abnormal state of the secondary battery, and a switch control circuit including a first switch for connecting the fourth terminal with the first terminal and a second switch for connecting the fourth terminal with the second terminal. At least one of the resistance between the fourth terminal and the first terminal and the resistance between the fourth terminal and the second terminal is greater than the on resistance value of the MOS transistor.

5 Claims, 4 Drawing Sheets

SECONDARY BATTERY PROTECTION CIRCUIT

CROSS-REFERENCE TO RELATED APPLICATION

The present application is based upon and claims the benefit of priority of Japanese Patent Application No. 2016-137100, filed on Jul. 11, 2016, the entire contents of which are incorporated herein by reference.

BACKGROUND OF THE INVENTION

1. Field of the Invention

An aspect of this disclosure relates to a secondary battery protection circuit.

2. Description of the Related Art

There are known protection circuits that protect secondary batteries by turning off switching elements inserted between the secondary batteries and loads on power supply paths (See, for example, Japanese Patent No. 4522384).

FIG. 1 is a diagram illustrating a configuration of a protection circuit 12 disclosed in Japanese Patent No. 4522384. When a secondary battery 11 is coupled to a battery charger 15, a control circuit 14 sets a gate voltage of a switching element 13 at an ON voltage of the switching element 13. At this time, as illustrated in FIG. 1, a voltage of a back gate contact 21 is set at a drain voltage.

When a voltage of the secondary battery 11 becomes greater than a highest set voltage, the control circuit 14 sets the gate voltage of the switching element 13 at a cut-off voltage. As a result, while a charging current is blocked by the switching element 13 and a diode 26B of parasitic diodes 26, a discharging current flows via the diode 26B when the secondary battery 11 is coupled to the load 16.

On the other hand, when the voltage of the secondary battery 11 becomes less than a lowest set voltage, the control circuit 14 sets the gate voltage of the switching element 13 at a cut-off voltage, and switches the voltage of the back gate contact 21 from the drain voltage to a source voltage. As a result, while a discharging current is blocked by the switching element 13 and a diode 26A of the parasitic diodes 26, a charging current flows via the diode 26A when the secondary battery 11 is coupled to the battery charger 15.

The control circuit 14 switches a changeover switch SW to the side of a terminal Vss or the side of a terminal Vm1, and thereby sets the voltage of the back gate contact 21 at the same level as the source or drain voltage of the switching element 13.

In the circuit illustrated in FIG. 1, while the charging current is blocked by the switching element 13, the discharging current flows through a negative terminal of a load 16, the Vm1 terminal, the changeover switch SW, a BG terminal, the back gate contact 21, the diode 26B, and a negative electrode of the secondary battery 11 in this order. On the other hand, while the discharging current is blocked by the switching element 13, the charging current flows through the negative electrode of the secondary battery 11, the Vss terminal, the changeover switch SW, the BG terminal, the back gate contact 21, the diode 26A, and the negative terminal of the battery charger 15 in this order.

However, when the changeover switch SW is implemented by a FET (field-effect transistor) having an on resistance value in the order of several mΩ, a chip area of several square mm is required only for the changeover switch SW, and the circuit area may increase. This is because the size of a FET increases as its on resistance value decreases.

SUMMARY OF THE INVENTION

According to an aspect of this disclosure, there is provided a secondary battery protection circuit for protecting a secondary battery by controlling a metal-oxide-semiconductor transistor inserted in a power supply path between the secondary battery and a load. The secondary battery protection circuit includes a first terminal connected to the power supply path at a position between the secondary battery and the metal-oxide-semiconductor transistor, a second terminal connected to the power supply path at a position between the load and the metal-oxide-semiconductor transistor, a third terminal connected to a gate of the metal-oxide-semiconductor transistor, a fourth terminal connected to a back gate of the metal-oxide-semiconductor transistor, an anomaly detection circuit configured to detect an abnormal state of the secondary battery, a control circuit configured to output a switch control signal based on the detected abnormal state of the secondary battery, and a switch control circuit configured to cause a gate control signal for controlling the gate of the metal-oxide-semiconductor transistor to be output from the third terminal, and cause a back gate control signal for controlling a voltage of the back gate of the metal-oxide-semiconductor transistor to be output from the fourth terminal, based on the switch control signal output by the control circuit. The switch control circuit includes a first switch configured to connect the fourth terminal with the first terminal and a second switch configured to connect the fourth terminal with the second terminal. The control circuit is configured to output the switch control signal to turn on the first switch in response to detection of a first type of the abnormal state, and to output the switch control signal to turn on the second switch in response to detection of a second type of the abnormal state. At least one of the resistance value between the fourth terminal and the first terminal connected via the first switch and the resistance value between the fourth terminal and the second terminal connected via the second switch is greater than the on resistance value of the metal-oxide-semiconductor transistor.

DESCRIPTION OF THE PREFERRED EMBODIMENTS

Embodiments of the present disclosure are described below with reference to the accompanying drawings. In the descriptions below, a source and a drain of a MOS (metal oxide semiconductor) transistor inserted in a power supply path between a secondary battery and a load have substantially the same configurations. Accordingly, the names of components representing a source and a drain in a MOS transistor may be exchanged. That is, a source may be referred to as a drain, and a drain may be referred to as a source.

Figure 1:
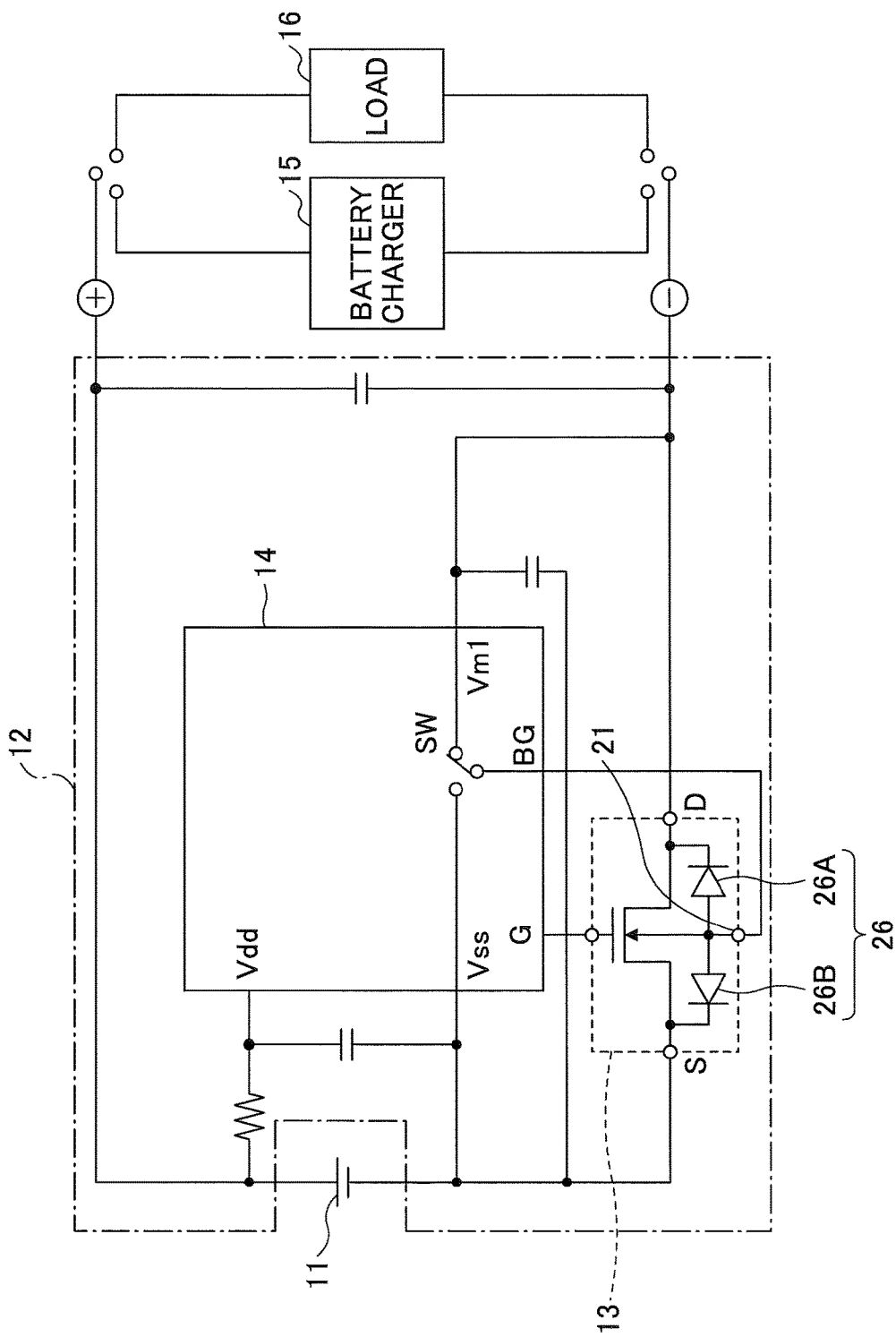
FIG. 1 is a diagram illustrating a configuration of a related-art protection circuit.
Figure 2:
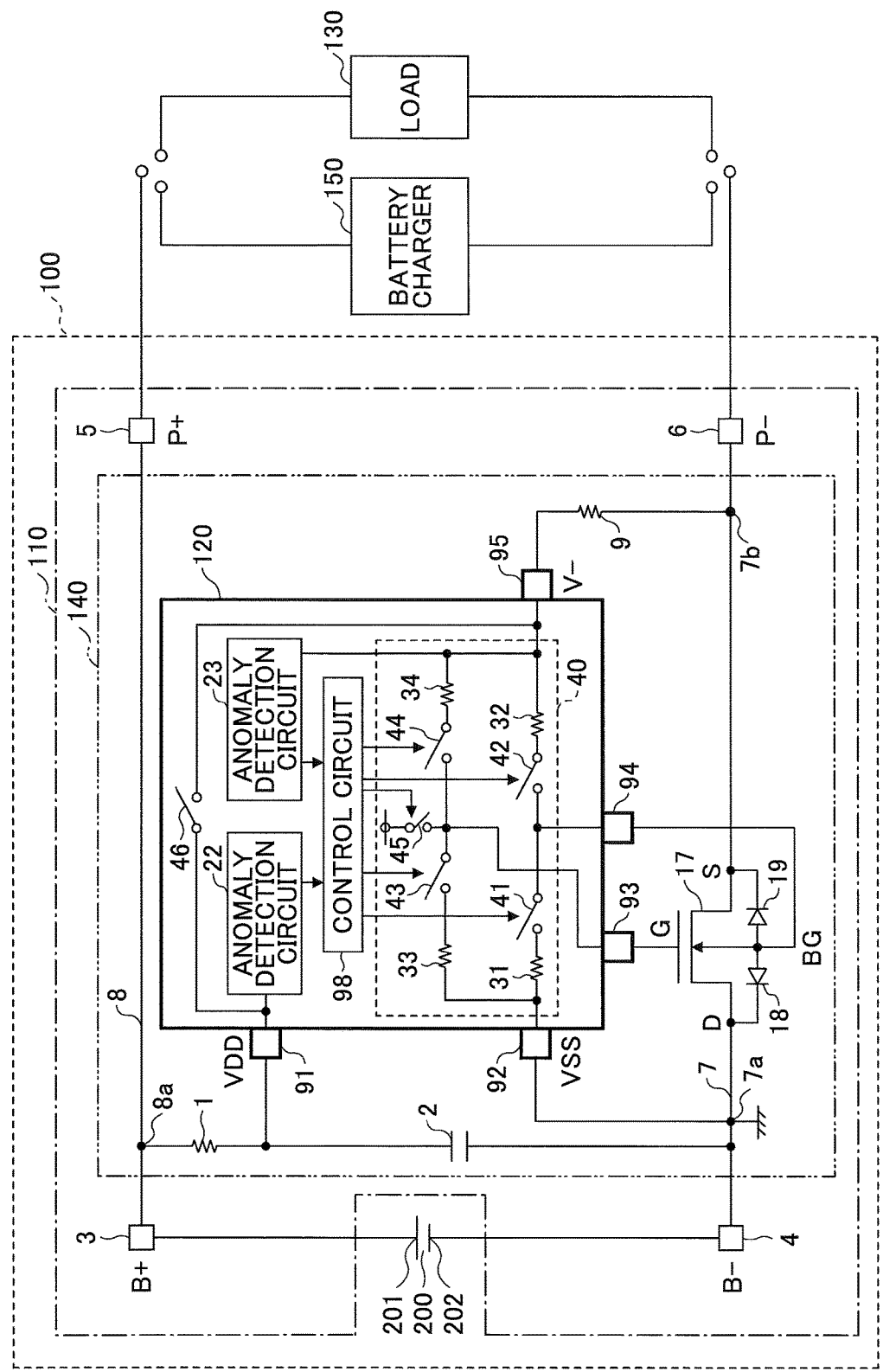
FIG. 2 is a diagram illustrating a first example of a configuration of a battery pack.

FIG. 2 is a diagram illustrating an example of a configuration of a battery pack 100 according to a first embodiment. The battery pack 100 includes a secondary battery 200 and a secondary battery protection device 110.

The secondary battery 200 is an example of a rechargeable battery. The secondary battery 200 can supply power to a load 130 that is coupled to a positive terminal 5 (P+ terminal) and a negative terminal 6 (P− terminal). The secondary battery 200 can be charged by a battery charger 150 coupled to the positive terminal 5 and the negative terminal 6. Examples of the secondary battery 200 include a lithium-ion battery and a lithium-polymer battery. The battery pack 100 may be included in the load 130 or externally attached to the load 130.

The load 130 is an example of a load to which power is supplied from the secondary battery 200 of the battery pack 100. The load 130 may be, for example, a portable device such as a mobile terminal. Examples of mobile terminals include a mobile phone, a smartphone, a tablet computer, a gaming machine, a television set, a music/video player, and a camera.

The secondary battery protection device 110 is driven by power supplied from the secondary battery 200, and protects the secondary battery 200 from, for example, overdischarge by controlling charging and discharging of the secondary battery 200. The secondary battery protection device 110 includes a charging-discharging control circuit 140, a battery positive electrode connection terminal 3 (B+ terminal), a battery negative electrode connection terminal 4 (B− terminal), a positive terminal 5, and a negative terminal 6.

The charging-discharging control circuit 140 protects the secondary battery 200 from, for example, overdischarge by controlling charging and discharging of the secondary battery 200. The charging-discharging control circuit 140 includes a MOS (Metal Oxide Semiconductor) transistor 17, a secondary battery protection integrated circuit 120, a resistor 1, a capacitor 2, and a resistor 9.

The battery positive electrode connection terminal 3 is an example of a terminal coupled to a positive electrode 201 of the secondary battery 200. The battery negative electrode connection terminal 4 is an example of a terminal coupled to a negative electrode 202 of the secondary battery 200. The positive terminal 5 is an example of a terminal coupled to a positive terminal of the load 130 or the battery charger 150. The negative terminal 6 is an example of a terminal coupled to a negative terminal of the load 130 or the battery charger 150.

The battery positive electrode connection terminal 3 and the positive terminal 5 are connected to each other via a positive power supply path 8, and the battery negative electrode connection terminal 4 and the negative terminal 6 are connected to each other via a negative power supply path 7. The positive power supply path 8 is an example of a charging-discharging current path between the battery positive electrode connection terminal 3 and the positive terminal 5, and the negative power supply path 7 is an example of a charging-discharging current path between the battery negative electrode connection terminal 4 and the negative terminal 6.

The charging-discharging control circuit 140 includes the MOS transistor 17. The MOS transistor 17 is an example of a MOS field-effect transistor that is inserted in series in the negative power supply path 7 between a first negative connection point 7a and a second negative connection point 7b. Turning off the MOS transistor 17 blocks the negative power supply path 7 through which a charging current or a discharging current of the secondary battery 200 flows. The MOS transistor 17 is an example of an N-channel type MOS transistor.

The charging-discharging control circuit 140 includes a secondary battery protection integrated circuit 120. The secondary battery protection integrated circuit 120 is driven by power supplied from the secondary battery 200, and protects the secondary battery 200 from, for example, overcurrent by controlling charging and discharging of the secondary battery 200. The secondary battery protection integrated circuit 120 receives power from the secondary battery 200 and protects the secondary battery 200.

The secondary battery protection integrated circuit 120 is an example of a protection IC (Integrated Circuit), and includes, for example, a power source terminal 91, a ground terminal 92, a gate control terminal 93, a bias output terminal 94, and a detection terminal 95.

The power source terminal 91 is a positive power source terminal coupled to the positive electrode 201 of the secondary battery 200 via the positive connection point 8a and the battery positive electrode connection terminal 3, and may be referred to as a VDD terminal. The power source terminal 91 is, for example, connected to a connection point between an end of the resistor 1 whose another end is connected to the positive power supply path 8 and an end of the capacitor 2 whose another end is connected to the negative power supply path 7. The other end of the capacitor 2 is connected to the negative power supply path 7 at the first negative connection point 7a between the battery negative electrode connection terminal 4 and the MOS transistor 17.

The ground terminal 92 is a negative power source terminal coupled to the negative electrode 202 of the secondary battery 200 via the first negative connection point 7a and the battery negative electrode connection terminal 4, and may be referred to as a VSS terminal. The ground terminal 92 is coupled to the negative power supply path 7 at the first negative connection point 7a between the battery negative electrode connection terminal 4 and the MOS transistor 17. The ground terminal 92 is an example of a first terminal.

The gate control terminal 93 is a terminal that is coupled to a gate G of the MOS transistor 17, and outputs a control signal for controlling the gate G of the MOS transistor 17. The gate control terminal 93 is an example of a third terminal.

The bias output terminal 94 is a terminal that is coupled to a back gate BG of the MOS transistor 17 and is for determining a voltage of the back gate BG. The bias output terminal 94 is an example of a fourth terminal.

The detection terminal 95 is a terminal that is coupled to the negative terminal 6 coupled to a ground side terminal of the load 130, and may be referred to as a V− terminal. The detection terminal 95 is coupled to the negative power supply path 7 via the resistor 9 at a second negative connection point 7b between the negative terminal 6 and the MOS transistor 17. The detection terminal 95 is an example of a second terminal.

The secondary battery protection integrated circuit 120 performs a protection process for the secondary battery 200 by controlling the MOS transistor 17. The secondary battery protection integrated circuit 120 includes a first anomaly detection circuit 22, a second anomaly detection circuit 23, switches 41 through 46, resistors 31 through 34, and a control circuit 98.

Each of the first anomaly detection circuit 22 and the second anomaly detection circuit 23 detects an anomaly in charging or discharging of the secondary battery 200, and includes, for example, a comparator for detecting the anomaly.

Based on an anomaly detection result by at least one of the first anomaly detection circuit 22 and the second anomaly detection circuit 23, the control circuit 98 outputs a switch control signal for controlling a switch control circuit 40, and controls on and off of the MOS transistor 17 via the switch control circuit 40. The control circuit 98 latches, for example, an output of the comparator that detects an anomaly of charging or discharging of the secondary battery 200, through a delay circuit. The control circuit 98 is implemented by, for example, a logic circuit. In FIG. 2, the switch control circuit 40 includes switches 41 through 45 and resistors 31 through 34.

The switch 41 and the resistor 31 are inserted in series in an electric current path that connects the bias output terminal 94 and the ground terminal 92 in the secondary battery protection integrated circuit 120. The switch 42 and the resistor 32 are inserted in series in an electric current path that connects the bias output terminal 94 and the detection terminal 95 in the secondary battery protection integrated circuit 120. The bias output terminal 94 is connected to an electric current path between the switch 41 and the switch 42 in the secondary battery protection integrated circuit 120.

The switch 43 and the resistor 33 are inserted in series in an electric current path that connects the gate control terminal 93 and the ground terminal 92 in the secondary battery protection integrated circuit 120. The switch 44 and the resistor 34 are inserted in series in an electric current path that connects the gate control terminal 93 and the detection terminal 95 in the secondary battery protection integrated circuit 120. The gate control terminal 93 is connected to an electric current path between the switch 43 and the switch 44 in the secondary battery protection integrated circuit 120, and coupled to a voltage of the power source terminal 91 via the switch 45 in the secondary battery protection integrated circuit 120.

The switch 46 is inserted in series in an electric current path that connects the detection terminal 95 and the power source terminal 91 in the secondary battery protection integrated circuit 120. When the switch 46 is turned on, the detection terminal 95 is pulled up to the voltage of the power source terminal 91.

The first anomaly detection circuit 22 monitors a battery voltage (cell voltage) of the secondary battery 200 by, for example, detecting a voltage between the power source terminal 91 and the ground terminal 92.

When detecting a cell voltage that is greater than or equal to a predetermined overcharge detection voltage Vdet1 by using a comparator, the first anomaly detection circuit 22 determines that an overcharge of the secondary battery 200 is detected, and outputs an overcharge detection signal. The overcharge of the secondary battery 200 represents an abnormal state where the secondary battery 200 is excessively charged (an example of an abnormal charging state of the secondary battery 200).

When detecting a cell voltage that is less than or equal to a predetermined overdischarge detection voltage Vdet2 by using the comparator, the first anomaly detection circuit 22 determines that an overdischarge of the secondary battery 200 is detected, and outputs an overdischarge detection signal. The overdischarge of the secondary battery 200 represents an abnormal state where the secondary battery 200 has excessively discharged (an example of an abnormal discharging state of the secondary battery 200).

The second anomaly detection circuit 23 monitors a voltage (sense voltage) between the negative terminal 6 and the battery negative electrode connection terminal 4 by, for example, detecting a voltage between the detection terminal 95 and the ground terminal 92.

When detecting a sense voltage that is greater than or equal to a predetermined over-discharging current detection voltage Vdet3 by using a comparator while the MOS transistor 17 is in the on state, the second anomaly detection circuit 23 determines that an over-discharging current of the secondary battery 200 is detected, and outputs an over-discharging current detection signal. The over-discharging current of the secondary battery 200 represents an abnormal state where an excessive discharging current flows in a discharging direction of the secondary battery 200 (an example of an abnormal discharging state of the secondary battery 200).

When detecting a sense voltage that is less than or equal to a predetermined over-charging current detection voltage Vdet4 by using a comparator while the MOS transistor 17 is in the on state, the second anomaly detection circuit 23 determines that an over-charging current of the secondary battery 200 is detected, and outputs an over-charging current detection signal. The over-charging current of the secondary battery 200 represents an abnormal state where an excessive charging current flows in a charging direction of the secondary battery 200 (an example of an abnormal charging state of the secondary battery 200).

While none of the abnormal charging state and the abnormal discharging state of the secondary battery 200 is detected by the first anomaly detection circuit 22 and the second anomaly detection circuit 23, the control circuit 98 outputs switch control signals to turn on the switch 41, turn off the switch 42, turn off the switch 43, turn off the switch 44, turn on the switch 45, and turn off the switch 46. Thus, the control circuit 98 turns on the switch 45 and thereby causes a gate control signal for turning on the MOS transistor 17 to be output via the switch control circuit 40 and the gate control terminal 93. Also, the control circuit 98 thereby connects the bias output terminal 94 with the ground terminal 92 within the secondary battery protection integrated circuit 120 without connecting the bias output terminal 94 with the detection terminal 95.

In other words, while none of the abnormal charging state and the abnormal discharging state of the secondary battery 200 is detected by the first anomaly detection circuit 22 and the second anomaly detection circuit 23, the control circuit 98 causes a gate control signal for turning on the MOS transistor 17 to be output via the switch control circuit 40 and the gate control terminal 93, and causes a back gate control signal with a voltage of the ground terminal 92 to be output via the switch control circuit 40 and the bias output terminal 94. As a result, the MOS transistor 17 is turned on, and the back gate BG of the MOS transistor 17 is coupled to the drain D of the MOS transistor 17 via the switch 41 and the ground terminal 92.

The gate control signal controls the gate of the MOS transistor. The back gate control signal controls the voltage of the back gate BG. By the back gate control signal, the voltage of the back gate BG is clamped.

Accordingly, when the battery charger 150 is connected, a charging current, which flows in the charging direction of the secondary battery 200, flows via the MOS transistor 17 in the on state. In contrast, when the load 130 is connected, a discharging current, which flows in the discharging direction of the secondary battery 200, flows via the MOS transistor 17 in the on state.

When an abnormal charging state of the secondary battery 200 is detected by the first anomaly detection circuit 22 or the second anomaly detection circuit 23, the control circuit 98 outputs switch control signals to turn off the switch 41, turn on the switch 42, turn off the switch 43, turn on the switch 44, and turn off the switch 45. The control circuit 98 thereby causes a gate control signal for turning off the MOS transistor 17 to be output via the switch control circuit 40 and the gate control terminal 93, and connects the bias output terminal 94 with the detection terminal 95 within the secondary battery protection integrated circuit 120 without connecting the bias output terminal 94 with the ground terminal 92.

In other words, when an abnormal charging state of the secondary battery 200 is detected by the first anomaly detection circuit 22 or the second anomaly detection circuit 23, the control circuit 98 causes a gate control signal for turning off the MOS transistor 17 to be output via the switch control circuit 40 and the gate control terminal 93, and causes a back gate control signal with a voltage of the detection terminal 95 to be output via the switch control circuit 40 and the bias output terminal 94. As a result, the MOS transistor 17 is turned off, and the back gate BG of the MOS transistor 17 is connected to the source S of the MOS transistor 17 via the switch 42 and the detection terminal 95.

Accordingly, even when the battery charger 150 is connected while the secondary battery 200 is in the abnormal charging state, the charging current flowing in the charging direction of the secondary battery 200 is blocked by the MOS transistor 17 in the off state and a parasitic diode 18. In contrast, when the load 130 is connected while the secondary battery 200 is in the abnormal charging state, the discharging current flowing in the discharging direction of the secondary battery 200 flows through the negative terminal 6, the resistor 9, the detection terminal 95, the resistor 32, the switch 42, the bias output terminal 94, the back gate BG, the parasitic diode 18, and the battery negative electrode connection terminal 4 in this order. The parasitic diode 18 is formed between the back gate BG and the drain D of the MOS transistor 17.

Here, the current value of the discharging current in the abnormal charging state of the secondary battery 200 is limited by the on resistance of the switch 42, the resistor 32, and the resistor 9. However, it is possible to reduce an increase in the chip area by making the impedance of a first control line (specifically, an electric current path between the bias output terminal 94 and the detection terminal 95) greater than the on resistance value of the MOS transistor 17. This also makes it easier to design a driver circuit for driving the switch 42. For example, a chip area required for mounting the switch 42 can be limited to about 0.1 mm square by implementing the switch 42 with a FET having an on resistance value in the order of several kΩ that is greater than the on resistance value in the order of several mΩ of the MOS transistor 17.

As described above, in the secondary battery protection integrated circuit 120, when the bias output terminal 94 and the detection terminal 95 are coupled to each other via the switch 42, the resistance value between the bias output terminal 94 and the detection terminal 95 is greater than the on resistance value of the MOS transistor 17. This makes it possible to reduce an increase in the circuit area of the secondary battery protection integrated circuit 120.

Also, the resistor 32 is inserted in series in the electric current path between the bias output terminal 94 and the detection terminal 95. The resistance value of the resistor 32 makes it easier to set the resistance between the bias output terminal 94 and the detection terminal 95 at a high value when they are connected via the switch 42.

When overcharging of the secondary battery 200 is detected by the first anomaly detection circuit 22, the control circuit 98 may turn on the switch 46. As a result, electric charges of the secondary battery 200 in the overcharging state are discharged to the battery negative electrode connection terminal 4 via the power source terminal 91, the switch 46 in the on state, the resistor 32, the switch 42 in the on state, the bias output terminal 94, the back gate BG, and the parasitic diode 18. This makes it possible to quickly correct the overcharging state of the secondary battery 200. The switch 46 is an example of a discharging circuit that discharges electric charges of the secondary battery 200 to the detection terminal 95 when overcharging of the secondary battery 200 is detected.

When an abnormal discharging state of the secondary battery 200 is detected by the first anomaly detection circuit 22 or the second anomaly detection circuit 23, the control circuit 98 turns on the switch 41, turns off the switch 42, turns on the switch 43, turns off the switch 44, and turns off the switch 45 by outputting switch control signals. The control circuit 98 thereby causes a control signal for turning off the MOS transistor 17 to be output via the switch control circuit 40 and the gate control terminal 93, and connects the bias output terminal 94 with the ground terminal 92 within the secondary battery protection integrated circuit 120 without connecting the bias output terminal 94 with the detection terminal 95.

In other words, when the abnormal discharging state of the secondary battery 200 is detected by the first anomaly detection circuit 22 or the second anomaly detection circuit 23, the control circuit 98 causes a gate control signal for turning off the MOS transistor 17 to be output via the switch control circuit 40 and the gate control terminal 93, and causes a back gate control signal with a voltage of the ground terminal 92 to be output via the bias output terminal 94. As a result, the MOS transistor 17 is turned off, and the back gate BG of the MOS transistor 17 is coupled to the drain D of the MOS transistor 17 via the switch 41 and the ground terminal 92.

With the above configuration, even when the load 130 is connected while the secondary battery 200 is in the abnormal discharging state, the discharging current flowing in the discharging direction of the secondary battery 200 is blocked by the MOS transistor 17 in the off state and a parasitic diode 19. In contrast, when the battery charger 150 is connected while the secondary battery 200 is in the abnormal discharging state, the charging current flowing in the charging direction of the secondary battery 200 flows through the battery negative electrode connection terminal 4, the ground terminal 92, the resistor 31, the switch 41, the bias output terminal 94, the back gate BG, the parasitic diode 19, and the negative terminal 6 in this order. The parasitic diode 19 is formed between the back gate BG and the source S of the MOS transistor 17.

Here, while the secondary battery 200 is in the abnormal discharging state, the current value of the charging current is limited by the on resistance of the switch 41 and the resistor 31. However, it is possible to reduce an increase in the chip area by making the impedance of a second control line (specifically, an electric current path between the bias output terminal 94 and the ground terminal 92) greater than the on resistance value of the MOS transistor 17. This also makes it easier to design a driver circuit for driving the switch 41. For example, a chip area required for mounting the switch 41 can be limited to about 0.1 mm square by implementing the switch 41 with a FET having an on resistance value in the order of several kΩ that is greater than the on resistance value in the order of several mΩ of the MOS transistor 17.

As described above, in the secondary battery protection integrated circuit 120, when the bias output terminal 94 and the ground terminal 92 are coupled to each other via the switch 41, the resistance value between the bias output terminal 94 and the ground terminal 92 is greater than the on resistance value of the MOS transistor 17. This makes it possible to reduce an increase in the circuit area of the secondary battery protection integrated circuit 120.

Also, the resistor 31 is inserted in series in the electric current path between the bias output terminal 94 and the ground terminal 92. The resistance value of the resistor 31 makes it easier to set the resistance value between the bias output terminal 94 and the ground terminal 92 at a high value when they are connected via the switch 41.

Figure 3:
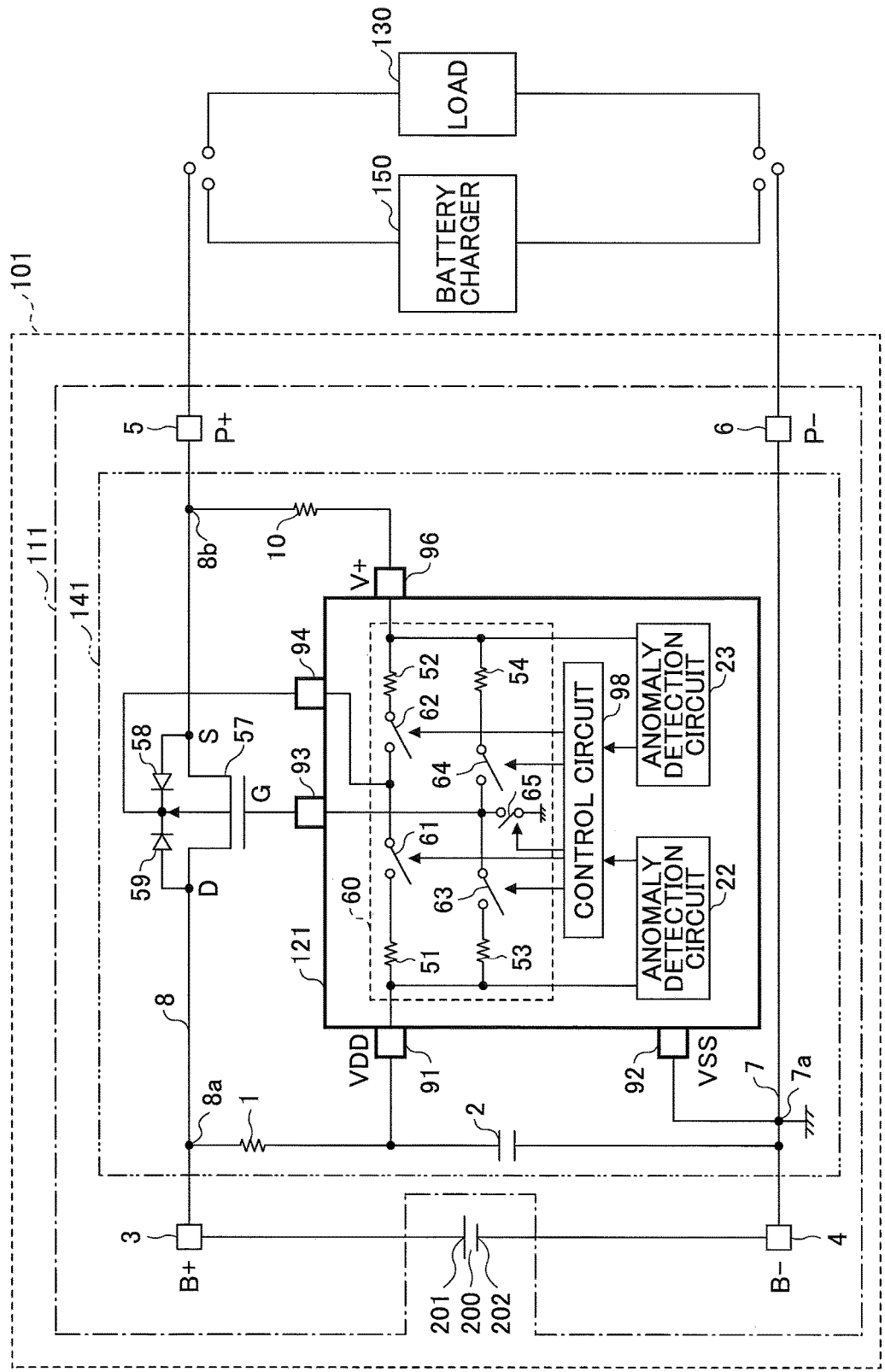
FIG. 3 is a diagram illustrating a second example of a configuration of a battery pack.

FIG. 3 is a diagram illustrating an example of a configuration of a battery pack 101 according to a second embodiment. Descriptions of components and effects of the configuration of FIG. 3 that are substantially the same as those of the configuration of FIG. 2 may be omitted here. The configuration of FIG. 3 is different from the configuration of FIG. 2 in that the secondary battery is protected by a P-channel type MOS transistor inserted in series in a positive power supply path 8.

The battery pack 101 includes a secondary battery 200 and a secondary battery protection device 111. The secondary battery protection device 111 is driven by power supplied from the secondary battery 200, and protects the secondary battery 200 from, for example, overdischarge by controlling charging and discharging of the secondary battery 200. The secondary battery protection device 111 includes a charging-discharging control circuit 141, a battery positive electrode connection terminal 3 (B+ terminal), a battery negative electrode connection terminal 4 (B− terminal), a positive terminal 5, and a negative terminal 6. The charging-discharging control circuit 141 includes a MOS transistor 57, a secondary battery protection integrated circuit 121, a resistor 1, a capacitor 2, and a resistor 10.

The charging-discharging control circuit 141 includes the MOS transistor 57. The MOS transistor 57 is an example of a MOS field-effect transistor that is inserted in series in the positive power supply path 8 between a first positive connection point 8a and a second positive connection point 8b. Turning off the MOS transistor 57 blocks the positive power supply path 8 through which a charging current or a discharging current of the secondary battery 200 flows. The MOS transistor 57 is an example of a P-channel type MOS transistor.

The secondary battery protection integrated circuit 121 is an example of an IC and includes, for example, a power source terminal 91, a ground terminal 92, a gate control terminal 93, a bias output terminal 94, and a detection terminal 96.

The detection terminal 96 is a terminal that is coupled to the positive terminal 5 coupled to the positive terminal of the load 130, and may be referred to as a V+ terminal. The detection terminal 96 is coupled to the positive power supply path 8 via the resistor 10 at a second positive connection point 8b between the positive terminal 5 and the MOS transistor 57. The detection terminal 96 is an example of a second terminal.

The secondary battery protection integrated circuit 121 performs a protection process for the secondary battery 200 by controlling the MOS transistor 57. The secondary battery protection integrated circuit 121 includes a first anomaly detection circuit 22, a second anomaly detection circuit 23, switches 61 through 65, resistors 51 through 54, and a control circuit 98.

Based on an anomaly detection result by at least one of the first anomaly detection circuit 22 and the second anomaly detection circuit 23, the control circuit 98 outputs a switch control signal for controlling a switch control circuit 60, and controls on and off of the MOS transistor 57 via the switch control circuit 60. The control circuit 98 latches, for example, an output of the comparator that detects an anomaly of charging or discharging of the secondary battery 200, through a delay circuit. The control circuit 98 is implemented by, for example, a logic circuit. In FIG. 3, the switch control circuit 60 includes switches 61 through 65 and resistors 51 through 54.

The switch 61 and the resistor 51 are inserted in series in an electric current path that connects the bias output terminal 94 and the power source terminal 91 in the secondary battery protection integrated circuit 121. The switch 62 and the resistor 52 are inserted in series in an electric current path that connects the bias output terminal 94 and the detection terminal 96 in the secondary battery protection integrated circuit 121. The bias output terminal 94 is connected to an electric current path between the switch 61 and the switch 62 in the secondary battery protection integrated circuit 121.

The switch 63 and the resistor 53 are inserted in series in an electric current path that connects the gate control terminal 93 and the power source terminal 91 in the secondary battery protection integrated circuit 121. The switch 64 and the resistor 54 are inserted in series in an electric current path that connects the gate control terminal 93 and the detection terminal 96 in the secondary battery protection integrated circuit 121. The gate control terminal 93 is connected to an electric current path between the switch 63 and the switch 64 in the secondary battery protection integrated circuit 121, and is coupled to a voltage of the ground terminal 92 via the switch 65 in the secondary battery protection integrated circuit 121.

The first anomaly detection circuit 22 detects overcharging or overdischarging of the secondary battery 200 by detecting a voltage between the power source terminal 91 and the ground terminal 92 in substantially the same manner as described with reference to FIG. 2.

The second anomaly detection circuit 23 detects an overdischarging current or an over-charging current of the secondary battery 200 by detecting a voltage between the detection terminal 96 and the electric power charge terminal 91 in substantially the same manner as described with reference to FIG. 2.

When none of the abnormal charging state and the abnormal discharging state of the secondary battery 200 is detected by the first anomaly detection circuit 22 and the second anomaly detection circuit 23, the control circuit 98 outputs switch control signals to turn on the switch 61, turn off the switch 62, turn off the switch 63, turn off the switch 64, and turn on the switch 65. Thus, the control circuit 98 turns on the switch 65 and thereby causes a gate control signal for turning on the MOS transistor 57 to be output via the switch control circuit 60 and the gate control terminal 93. Also, the control circuit 98 thereby connects the bias output terminal 94 with the power source terminal 91 within the secondary battery protection integrated circuit 121 without connecting the bias output terminal 94 with the detection terminal 95.

That is, when none of the abnormal charging state and the abnormal discharging state of the secondary battery 200 is detected by the first anomaly detection unit 22 and the second anomaly detection unit 23, the control circuit 98 causes a gate control signal for turning on the MOS transistor 57 to be output via the switch control circuit 60 and the gate control terminal 93, and causes a back gate control signal with a voltage of the power source terminal 91 to be output via the switch control circuit 60 and the bias output terminal 94. As a result, the MOS transistor 57 is turned on, and the back gate BG of the MOS transistor 57 is coupled to the drain D of the MOS transistor 57 via the switch 61 and the power source terminal 91.

Accordingly, when the battery charger 150 is connected, a charging current, which flows in the charging direction of the secondary battery 200, flows via the MOS transistor 57 in the on state. In contrast, when the load 130 is connected, a discharging current, which flows in the discharging direction of the secondary battery 200, flows via the MOS transistor 57 in the on state.

When an abnormal charging state of the secondary battery 200 is detected by the first anomaly detection circuit 22 or the second anomaly detection circuit 23, the control circuit 98 outputs switch control signals to turn off the switch 61, turn on the switch 62, turn off the switch 63, turn on the switch 64, and turn off the switch 65. The control circuit 98 thereby causes a gate control signal for turning off the MOS transistor 57 to be output via the switch control circuit 60 and the gate control terminal 93, and connects the bias output terminal 94 with the detection terminal 96 within the secondary battery protection integrated circuit 121 without connecting the bias output terminal 94 with the power source terminal 91.

In other words, when an abnormal charging state of the secondary battery 200 is detected by the first anomaly detection circuit 22 or the second anomaly detection circuit 23, the control circuit 98 causes a gate control signal for turning off the MOS transistor 57 to be output via the switch control circuit 60 and the gate control terminal 93, and causes a back gate control signal with a voltage of the detection terminal 96 to be output via the switch control circuit 60 and the bias output terminal 94. As a result, the MOS transistor 57 is turned off, and the back gate BG of the MOS transistor 57 is connected to a source S of the MOS transistor 57 via the switch 62 and the detection terminal 96.

Accordingly, even if the battery charger 150 is connected while the secondary battery 200 is in the abnormal charging state, the charging current flowing in the charging direction of the secondary battery 200 is blocked by the MOS transistor 57 in the off state and a parasitic diode 59. In contrast, when the load 130 is connected while the secondary battery 200 is in the abnormal charging state, the discharging current flowing in the discharging direction of the secondary battery 200 flows through the battery positive electrode connection terminal 3, the parasitic diode 59, the back gate BG, the bias output terminal 94, the switch 62, the resistor 52, the detection terminal 96, the resistor 10, and the positive terminal 5. The parasitic diode 59 is formed between the back gate BG and the drain D of the MOS transistor 57.

Here, the current value of the discharging current in the abnormal charging state of the secondary battery 200 is limited by the on resistance of the switch 62, the resistor 52, and the resister 10. However, it is possible to reduce an increase in the chip area by making the impedance of a third control line (specifically, an electric current path between the bias output terminal 94 and the detection terminal 96) greater than the on resistance value of the MOS transistor 57. This also makes it easier to design a driver circuit for driving the switch 62. For example, a chip area required for mounting the switch 62 can be limited to about 0.1 mm square by implementing the switch 62 with an FET having an on resistance value in the order of several kΩ that is greater than the on resistance value in the order of several mΩ of the MOS transistor 57.

As described above, in the secondary battery protection integrated circuit 121, when the bias output terminal 94 and the detection terminal 96 are coupled to each other via the switch 62, the resistance value between the bias output terminal 94 and the detection terminal 96 is greater than the on resistance value of the MOS transistor 57. This makes it possible to reduce an increase in the circuit area of the secondary battery protection integrated circuit 121.

Also, the resistor 52 is inserted in series in the electric current path between the bias output terminal 94 and the detection terminal 96. The resistance value of the resistor 52 makes it easier to set the resistance between the bias output terminal 94 and the detection terminal 96 at a high value when they are connected via the switch 62.

When an abnormal discharging state of the secondary battery 200 is detected by the first anomaly detection circuit 22 or the second anomaly detection circuit 23, the control circuit 98 outputs switch control signals to turn on the switch 61, turn off the switch 62, turn on the switch 63, turn off the switch 64, and turn off the switch 65. The control circuit 98 thereby causes a control signal for turning off the MOS transistor 57 to be output via the switch control circuit 60 and the gate control terminal 93, and connects the bias output terminal 94 with the power source terminal 91 within the secondary battery protection integrated circuit 120 without connecting the bias output terminal 94 with the detection terminal 96.

In other words, when the abnormal discharging state of the secondary battery 200 is detected by the first anomaly detection circuit 22 or the second anomaly detection circuit 23, the control circuit 98 causes a gate control signal for turning off the MOS transistor 57 to be output via the switch control circuit 60 and the gate control terminal 93, and causes a back gate control signal with a voltage of the power source terminal 91 to be output from the bias output terminal 94. As a result, the MOS transistor 57 is turned off, and the back gate BG of the MOS transistor 57 is coupled to the drain D of the MOS transistor 57 via the switch 61 and the power source terminal 91.

Accordingly, even if the load 130 is connected while the secondary battery 200 is in the abnormal discharging state, the discharging current, which flows in the discharging direction of the secondary battery 200, is blocked by the MOS transistor 57 in the off state and a parasitic diode 58. In contrast, when the battery charger 150 is connected while the secondary battery 200 is in the abnormal discharging state, the charging current, which flows in the charging direction of the secondary battery 200, flows through the positive terminal 5, the parasitic diode 58, the back gate BG, the bias output terminal 94, the switch 61, the resistor 51, the power source terminal 91, the resister 1, and the battery positive electrode connection terminal 3 in this order. The parasitic diode 58 is formed between the back gate BG and the source S of the MOS transistor 57.

Here, the current value of the charging current in the abnormal discharging state of the secondary battery 200 is limited by the on resistance of the switch 61, the resistor 51, and the resistor 1. However, it is possible to reduce an increase in the chip area by making the impedance of a fourth control line (specifically, an electric current path between the bias output terminal 94 and the power source terminal 91) greater than the on resistance value of the MOS transistor 57. This also makes it easier to design a driver circuit for driving the switch 61. For example, a chip area required for mounting the switch 61 can be limited to about 0.1 mm square by implementing the switch 61 with a FET having an on resistance value in the order of several kΩ that is greater than the on resistance value in the order of several mΩ of the MOS transistor 57.

As described above, in the secondary battery protection integrated circuit 121, when the bias output terminal 94 and the power source terminal 91 are coupled to each other via the switch 61, the resistance value between the bias output terminal 94 and the power source terminal 91 is greater than the on resistance value of the MOS transistor 57. This makes it possible to reduce an increase in the circuit area of the secondary battery protection integrated circuit 121.

Also, the resistor 51 is inserted in series in the electric current path between the bias output terminal 94 and the power source terminal 91. The resistance value of the resistor 51 makes it easier to set the resistance value between the bias output terminal 94 and the power source terminal 91 at a high value when they are connected to each other via the switch 61.

Figure 4:
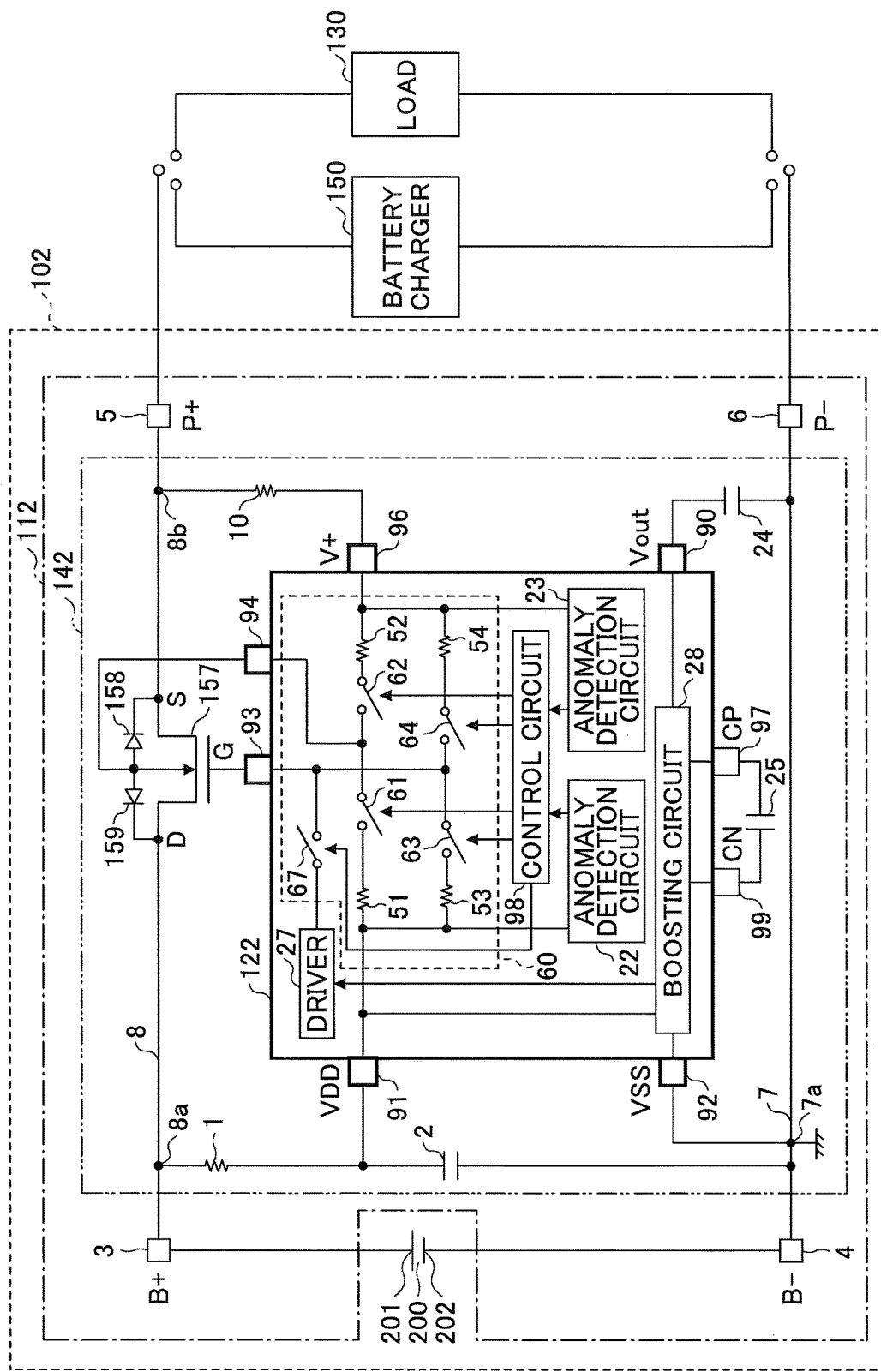
FIG. 4 is a diagram illustrating a third example of a configuration of a battery pack.

FIG. 4 is a diagram illustrating an example of a configuration of a battery pack 102 according to a third embodiment. Descriptions of components and effects of the configuration of FIG. 4 that are substantially the same as those of the configurations of FIGS. 2 and 3 may be omitted here. The configuration of FIG. 4 is different from the configurations of FIGS. 2 and 3 in that the secondary battery is protected by an N-channel type MOS transistor inserted in series in a positive power supply path 8.

The battery pack 102 includes a secondary battery 200 and a secondary battery protection device 112. The secondary battery protection device 112 is driven by power supplied from the secondary battery 200, and protects the secondary battery 200 from, for example, overdischarge by controlling charging and discharging of the secondary battery 200. The secondary battery protection device 112 includes a charging-discharging control circuit 142, a battery positive electrode connection terminal 3 (B+ terminal), a battery negative electrode connection terminal 4 (B− terminal), a positive terminal 5, and a negative terminal 6. The charging-discharging control circuit 142 includes a MOS transistor 157, a secondary battery protection integrated circuit 122, a resistor 1, a capacitor 2, and a resistor 10.

The charging-discharging control circuit 142 includes the MOS transistor 157. The MOS transistor 157 is an example of a MOS field-effect transistor that is inserted in series in the positive power supply path 8 between a first positive connection point 8a and a second positive connection point 8b. Turning off the MOS transistor 157 blocks the positive power supply path 8 through which a charging current or a discharging current of the secondary battery 200 flows. The MOS transistor 157 is an example of an N-channel type MOS transistor.

The secondary battery protection integrated circuit 122 is an example of an IC and includes, for example, a power source terminal 91, a ground terminal 92, a gate control terminal 93, a bias output terminal 94, a detection terminal 96, and capacity connection terminals 90, 97, and 99. The capacity connection terminals 90, 97, and 99 may be referred to as a Vout terminal, a CP terminal, and a CN terminal, respectively. A capacitor 25 is connected between the capacity connection terminal 99 and the capacity connection terminal 97, and a capacitor 24 is connected between the capacity connection terminal 90 and the ground terminal 92.

The secondary battery protection integrated circuit 122 performs a protection process for the secondary battery 200 by controlling the MOS transistor 57. The secondary battery protection integrated circuit 122 includes a first anomaly detection circuit 22, a second anomaly detection circuit 23, switches 61-64 and 67, resistors 51 through 54, a boosting circuit 28, a driver circuit 27, and a control circuit 98. In FIG. 4, the switch control circuit 60 includes the switches 61-64 and 67 and the resistors 51 through 54.

The boosting circuit 28 is a charge pump circuit for boosting a voltage by using the capacitor 25 and the capacitor 24. The boosting circuit 28 obtains a supply voltage that is boosted by a boosting function to a level higher than the voltage between the power source terminal 91 and the ground terminal 92, and supplies the obtained supply voltage to the driver circuit 27.

In the case of FIG. 3, the control circuit 98 turns on the switch 65 and thereby outputs a low-level gate control signal to turn on the P-channel type MOS transistor 57. In the case of FIG. 4, the control circuit 98 turns on the switch 67 and thereby outputs a high-level gate control signal (with the voltage level boosted by the boosting circuit 28) to turn on the N-channel type MOS transistor 157.

When none of the abnormal charging state and the abnormal discharging state of the secondary battery 200 is detected by the first anomaly detection circuit 22 and the second anomaly detection circuit 23, the control circuit 98 of FIG. 4 outputs switch control signals to turn on the switch 61, turn off the switch 62, turn off the switch 63, turn off the switch 64, and turn on the switch 67. The control circuit 98 thereby causes a gate control signal for turning on the MOS transistor 157 to be output via the switch control circuit 60 and the gate control terminal 93, and connects the bias output terminal 94 with the power source terminal 91 in the secondary battery protection integrated circuit 121 without connecting the bias output terminal 94 with the detection terminal 96.

In other words, while none of the abnormal charging state and the abnormal discharging state of the secondary battery 200 is detected by the first anomaly detection unit 22 and the second anomaly detection unit 23, the control circuit 98 causes a gate signal with a voltage level boosted by the boosting circuit 28 to be output via the switch control circuit 60 and the gate control terminal 93, and causes a back gate control signal with a voltage of the power source terminal 91 to be output via the switch control circuit 60 and the bias output terminal 94. As a result, the MOS transistor 157 is turned on, and the back gate BG of the MOS transistor 157 is coupled to the drain D of the MOS transistor 157 via the switch 61 and the power source terminal 91.

Accordingly, when the battery charger 150 is connected, a charging current flowing in the charging direction of the secondary battery 200 flows via the MOS transistor 157 in the on state. Also, when the load 130 is connected, a discharging current flowing in the discharging direction of the secondary battery 200 flows via the MOS transistor 157 in the on state.

When an abnormal charging state of the secondary battery 200 is detected by the first anomaly detection circuit 22 or the second anomaly detection circuit 23, the control circuit 98 outputs switch control signals to turn on the switch 61, turn off the switch 62, turn on the switch 63, turn off the switch 64, and turn off the switch 67. The control circuit 98 thereby causes a gate control signal for turning off the MOS transistor 157 to be output via the switch control circuit 60 and the gate control terminal 93, and connects the bias output terminal 94 with the power source terminal 91 within the secondary battery protection integrated circuit 122 without connecting the bias output terminal 94 with the detection terminal 96.

In other words, while an abnormal charging state of the secondary battery 200 is detected by the first anomaly detection circuit 22 or the second anomaly detection circuit 23, the control circuit 98 causes a gate control signal for turning off the MOS transistor 157 to be output via the switch control circuit 60 and the gate control terminal 93, and causes a back gate control signal with a voltage of the power source terminal 91 to be output via the switch control circuit 60 and the bias output terminal 94. As a result, the MOS transistor 157 is turned off, and the back gate BG of the MOS transistor 157 is connected to the drain D of the MOS transistor 157 via the switch 61, the power source terminal 91, and the resistor 1.

Accordingly, even if the battery charger 150 is connected while the secondary battery 200 is in the abnormal charging state, the charging current flowing in the charging direction of the secondary battery 200 is blocked by the MOS transistor 157 in the off state and a parasitic diode 158. In contrast, when the load 130 is connected while the secondary battery 200 is in the abnormal charging state, the discharging current flowing in the discharging direction of the secondary battery 200 flows through the battery positive electrode connection terminal 3, the resistor 1, the power source terminal 91, the resistor 51, the switch 61, the bias output terminal 94, the back gate BG, the parasitic diode 158, and the positive terminal 5. The parasitic diode 158 is formed between the back gate BG and the source S of the MOS transistor 157.

When an abnormal discharging state of the secondary battery 200 is detected by the first anomaly detection circuit 22 or the second anomaly detection circuit 23, the control circuit 98 outputs switch control signals to turn off the switch 61, turn on the switch 62, turn off the switch 63, turn on the switch 64, and turn off the switch 67. The control circuit 98 thereby causes a control signal for turning off the MOS transistor 157 to be output via the switch control circuit 60 and the gate control terminal 93, and connects the bias output terminal 94 with the detection terminal 96 within the secondary battery protection integrated circuit 122 without connecting the bias output terminal 94 with the power source terminal 91.

In other words, when the abnormal discharging state of the secondary battery 200 is detected by the first anomaly detection circuit 22 or the second anomaly detection circuit 23, the control circuit 98 causes a gate control signal for turning off the MOS transistor 157 to be output via the switch control circuit 60 and the gate control terminal 93, and causes a back gate control signal with a voltage of the detection terminal 96 to be output from the bias output terminal 94. As a result, the MOS transistor 157 is turned off, and the back gate BG of the MOS transistor 157 is coupled to the source S of the MOS transistor 157 via the switch 62, the detection terminal 96, and the resistor 10.

Accordingly, even if the load 130 is connected while the secondary battery 200 is in the abnormal discharging state, the discharging current flowing in the discharging direction of the secondary battery 200 is blocked by the MOS transistor 157 in the off state and a parasitic diode 159. In contrast, when the battery charger 150 is connected while the secondary battery 200 is in the abnormal discharging state, the charging current flowing in the charging direction of the secondary battery 200 flows through the positive terminal 5, the resistor 10, the detection terminal 96, the resistor 52, the switch 62, the bias output terminal 94, the back gate BG, the parasitic diode 159, and the battery positive electrode connection terminal 3. The parasitic diode 159 is formed between the back gate BG and the source S of the MOS transistor 157.

In the secondary battery protection integrated circuit 122, when the bias output terminal 94 and the detection terminal 96 are coupled to each other via the switch 62, the resistance value between the bias output terminal 94 and the detection terminal 96 is greater than the on resistance value of the MOS transistor 157. Also, when the bias output terminal 94 and the power source terminal 91 are coupled to each other via the switch 61, the resistance value between the bias output terminal 94 and the power source terminal 91 is greater than the on resistance value of the MOS transistor 157. Accordingly, similarly to the configuration of FIG. 3, the configuration of FIG. 4 makes it possible to reduce an increase in the circuit area of the secondary battery protection integrated circuit 122.

An aspect of this disclosure makes it possible to reduce an increase in the circuit area of a secondary battery protection circuit.

A secondary battery protection circuit, a secondary battery protection device, and a battery pack according the embodiments of the present invention are described above. However, the present invention is not limited to the specifically disclosed embodiments, and variations and modifications may be made without departing from the scope of the present invention. Also, the above-described embodiments may be combined in any appropriate manner.

What is claimed is:

1. A secondary battery protection circuit for protecting a secondary battery by controlling a metal-oxide-semiconductor transistor inserted in a power supply path between the secondary battery and a load, the secondary battery protection circuit comprising:

a first terminal connected to the power supply path at a position between the secondary battery and the metal-oxide-semiconductor transistor;

a second terminal connected to the power supply path at a position between the load and the metal-oxide-semiconductor transistor;

a third terminal connected to a gate of the metal-oxide-semiconductor transistor;

a fourth terminal connected to a back gate of the metal-oxide-semiconductor transistor;

an anomaly detection circuit configured to detect an abnormal state of the secondary battery;

a control circuit configured to output a switch control signal based on the detected abnormal state of the secondary battery; and a switch control circuit configured to cause a gate control signal for controlling the gate of the metal-oxide-semiconductor transistor to be output from the third terminal, and cause a back gate control signal for controlling a voltage of the back gate of the metal-oxide-semiconductor transistor to be output from the fourth terminal, based on the switch control signal output by the control circuit, wherein the switch control circuit includes a first switch configured to connect the fourth terminal with the first terminal and a second switch configured to connect the fourth terminal with the second terminal;

the control circuit is configured to output the switch control signal to turn on the first switch in response to detection of a first type of the abnormal state, and to output the switch control signal to turn on the second switch in response to detection of a second type of the abnormal state; and at least one of a resistance value between the fourth terminal and the first terminal connected via the first switch and a resistance value between the fourth terminal and the second terminal connected via the second switch is greater than an on resistance value of the metal-oxide-semiconductor transistor.

2. The secondary battery protection circuit according to claim 1, wherein the control circuit is configured to output the switch control signal to turn on the first switch in response to detection of an abnormal discharging state of the secondary battery, and to output the switch control signal to turn on the second switch in response to detection of an abnormal charging state of the secondary battery.

3. The secondary battery protection circuit according to claim 1, further comprising:

a discharging circuit configured to discharge electric charges of the secondary battery from the fourth terminal in response to detection of overcharging of the secondary battery.

4. The secondary battery protection circuit according to claim 1, further comprising:

a first resistor disposed in an electric current path between the fourth terminal and the first terminal; and a second resistor disposed in an electric current path between the fourth terminal and the second terminal.

5. The secondary battery protection circuit according to claim 1, wherein the secondary battery protection circuit is implemented as an integrated circuit.

* * * * *